(12) United States Patent
Homma

(10) Patent No.: US 6,865,620 B2
(45) Date of Patent: Mar. 8, 2005

(54) IMAGE FORMING DEVICE CONTROL SYSTEM AND METHOD

(75) Inventor: Masayuki Homma, Ohta-ku (JP)

(73) Assignee: Canon Kabushiki Kaisha (JP)

( * ) Notice: Subject to any disclaimer, the term of this patent is extended or adjusted under 35 U.S.C. 154(b) by 265 days.

(21) Appl. No.: 09/725,607

(22) Filed: Nov. 29, 2000

(65) Prior Publication Data
US 2001/0017700 A1 Aug. 30, 2001

(30) Foreign Application Priority Data
Nov. 30, 1999 (JP) ............................................. 11-340078

(51) Int. Cl.$^7$ ............................................. G06F 3/00
(52) U.S. Cl. .............................. 710/19; 710/15; 710/18; 358/1
(58) Field of Search ............................. 710/15, 18, 19; 358/1

(56) References Cited

U.S. PATENT DOCUMENTS

| | | | | |
|---|---|---|---|---|
| 4,586,147 A | * | 4/1986 | Tadokoro | 702/184 |
| 5,550,956 A | * | 8/1996 | Tadokoro | 358/1.14 |
| 5,745,686 A | * | 4/1998 | Saito et al. | 717/168 |
| 5,754,308 A | * | 5/1998 | Lopresti et al. | 358/403 |
| 6,129,274 A | * | 10/2000 | Suzuki | 235/381 |
| 6,202,092 B1 | * | 3/2001 | Takimoto | 709/225 |

FOREIGN PATENT DOCUMENTS

| | | | | |
|---|---|---|---|---|
| JP | 409274547 | * | 10/1997 | G06F/3/12 |
| JP | 4093301190 | * | 12/1997 | G06F/3/12 |
| JP | 10017202 | * | 1/1998 | B65H/43/00 |

* cited by examiner

Primary Examiner—Jeffrey Gaffin
Assistant Examiner—Justin Knapp
(74) Attorney, Agent, or Firm—Rossi, Kimms & McDowell

(57) ABSTRACT

A peripheral device control system is provided, which is capable of storing predetermined usage conditions of a peripheral device for every user or every operating mode without increasing the memory capacity of the peripheral device. In a multifunction printer, a user ID of a user who used the peripheral device, an operating mode of the multifunction printer, and the number of sheets discharged from the multifunction printer are stored as history information in a memory. According to a command of a history information acquisition job from a host computer, the history information is transmitted to the host computer. The host computer develops and manages the history information acquired from the multifunction printer as a paper discharge counter table for every operating mode. Thus, the peripheral device control system can store the usage conditions of the multifunction printer for every user or every operating mode without increasing the memory capacity of the multifunction printer and hence increasing the cost. It is therefore possible to finely calculate and manage the usage conditions to charge users.

28 Claims, 10 Drawing Sheets

FIG. 8A

| CONTENTS | NUMBER OF BYTES |
|---|---|
| OCCURRENCE TIME | 8 |
| USER ID | 2 |
| PAPER SIZE | 2 |
| PRINTING MODE | 1 |
| TONER COLOR | 1 |
| PAPER TYPE | 1 |
| SHEETS | 2 |

FIG. 8B

| |
|---|
| 1998.12.10.13:35 |
| 0002 |
| A4 |
| ONE-SIDE |
| BALCK-AND-WHITE |
| PLAIN PAPER |
| 10 |

IMAGE FORMING DEVICE CONTROL SYSTEM AND METHOD

BACKGROUND OF THE INVENTION

1. Field of the Invention

The present invention relates to a peripheral device control system, which is comprised of peripheral devices and an information processing apparatus connected thereto through a network.

2. Description of Related Art

Peripheral devices, such as a printer, a scanner, a facsimile, a copy machine and a multifunction printer having functions of these devices, are provided with known functions, i.e. a function of counting the total number of prints for every user or every section and charging for the counted number every month, and a function of restricting the use of a peripheral device when the number of prints of the device reaches the upper limit designated for each user.

As other known functions, a job (command) is issued to print an original in an information processing apparatus (e.g., a host computer and a workstation) from the information processing apparatus which is connected to a peripheral device through a network to the peripheral device, and a job is issued to acquire data about the number of prints produced by every user, from the peripheral device, and then the number of prints produced by every user who used the peripheral device is calculated and managed, according to an application program (control program) provided in the information processing apparatus.

It is desired, however, to not only count the number of prints, but also to count the number of prints for every operating mode including, for example, a paper size such as A4 and A3, a printing mode such as one-side printing and double-side printing, a toner color, and a paper type and then finely sum up and manage such usage conditions in order to charge users.

If, however, there are one-thousand users, there are ten paper sizes, there are two printing modes of one-side printing and double-side printing, there are three toner colors of full color, monochromatic color and black-and-white, and there are five paper types, for example, it is necessary to prepare counters in the number of combinations thereof. That is, if four bytes (B) are required for one counter, it is necessary to provide the storage capacity (memory capacity) of about 1 MB (1,000 users×10 paper sizes×2 printing modes×3 toner colors×5 paper types×4 B=1,200,000 B). Conventional peripheral devices, however, do not have enough memory capacity to store the information for every operating mode. The memory must be expanded to address this problem, which increases the cost of the peripheral devices.

SUMMARY OF THE INVENTION

It is therefore an object of the present invention to provide a peripheral device control system that is capable of storing predetermined usage conditions of a peripheral device with respect to every user or every operating mode without increasing the memory capacity of the peripheral device.

To attain the above object, in a first aspect of the present invention, there is provided a peripheral device control system comprising a peripheral device including a history information storage means for storing history information including a user ID of a user who used the peripheral device, an operating mode of the peripheral device and a number of sheets discharged from the peripheral device, an information processing apparatus including history information acquisition means for transmitting a history information acquisition job to the peripheral device and for acquiring the history information stored by the history information storage means, and storage means for storing the history information acquired by the history information acquisition means as a paper discharge counter table for every operating mode of the peripheral device, and a network that connects the information processing apparatus to the peripheral device.

Preferably, the peripheral device comprises job receiving means for receiving the history information acquisition job transmitted from the information processing apparatus, and transmission means for transmitting the stored history information according to the history information acquisition job received from the job receiving means.

Also preferably, the peripheral device comprises notification means for notifying the information processing apparatus of an amount of the history information stored by the history information acquisition means.

More preferably, the notification means notifies the information processing apparatus when the amount of history information reaches a predetermined amount.

To attain the above object, in a second aspect of the present invention, there is provided a peripheral device, which is connected to an information processing apparatus through a network, the peripheral device comprising history information storage means for storing history information including a user ID of a user who used the peripheral device, an operating mode of the peripheral device, and a number of sheets discharged from the peripheral device, and history information transmission means for transmitting the history information stored by the history information storage means in response to a history information acquisition job transmitted from the information processing apparatus.

To attain the above object, in a third aspect of the present invention, there is provided an information processing apparatus connected to a peripheral device having history information storage means for storing history information including a user ID of a user who used the peripheral device, an operating mode of the peripheral device, and a number of sheets discharged from the peripheral device, the information processing apparatus comprising history information acquisition means for transmitting a history information acquisition job to the peripheral device and for acquiring the history information stored by the history information storage means according to the history information acquisition job, and storage means for storing the history information acquired by the history information acquisition means as a paper discharge counter table for every operating mode of the peripheral device.

To attain the above object, in a fourth aspect of the present invention, there is provided a history information transmission method for a peripheral device connected to an information processing apparatus through a network, the method comprising the steps of storing history information including a user ID of a user who used the peripheral device, an operating mode of the peripheral device, and a number of sheets discharged from the peripheral device, and transmitting the history information stored in the history information storage step to the information processing apparatus in response to a history information acquisition job transmitted from the information processing apparatus.

To attain the above object, in a fifth aspect of the present invention, there is provided a peripheral device control method of controlling a peripheral device having history information storage means for storing history information including a user ID of a user who used the peripheral device, an operating mode of the peripheral device, and a number of sheets discharged from the peripheral device, the method comprising the steps of transmitting a history information acquisition job to the peripheral device, for acquiring the history information stored by the history information storage means according to the history information acquisition job, and storing the history information acquired in the history information acquisition step as a paper discharge counter table for every operating mode of the peripheral device.

In the first to fifth aspects, preferably, the operating mode includes at least one of a paper size, a one-side/double-side printing mode, a toner color, and a paper type.

Also preferably, the peripheral device includes at least one of a printer function, a copying function, a facsimile function, and a scanner function.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 8A and 8B are schematic diagrams showing one record of history information stored in the multifunction printer 100 in FIG. 1;

DETAILED DESCRIPTION OF THE PREFERRED EMBODIMENT

The present invention will be described hereinbelow with reference to the accompanying drawings showing a preferred embodiment thereof.

Figure 1:
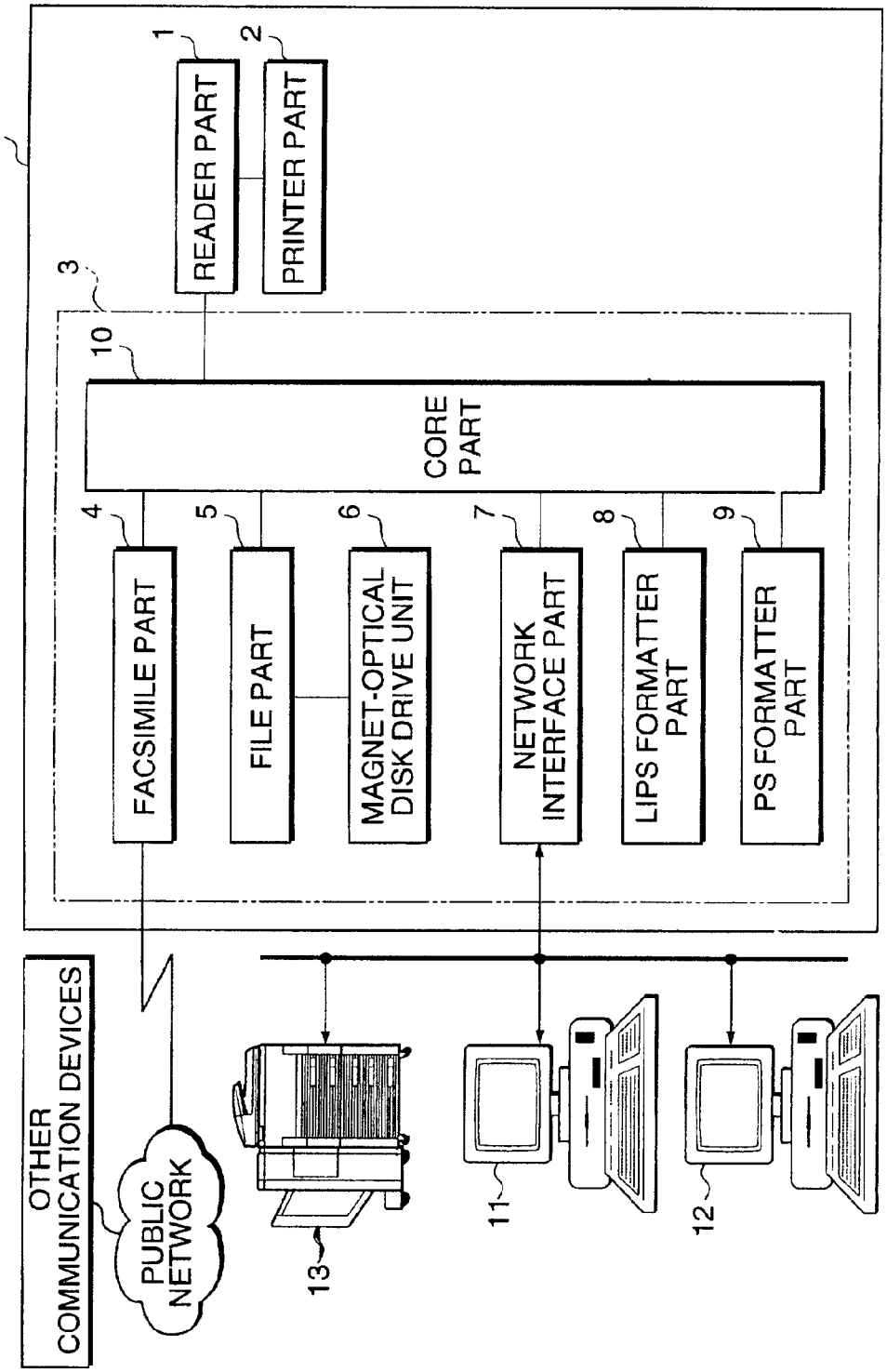
FIG. 1 is a block diagram showing the whole construction of a peripheral device control system according to an embodiment of the present invention.

FIG. 1 is a block diagram showing the whole peripheral device control system according to the present invention. In FIG. 1, a multifunction printer 100 is an integral type multifunction printer that has a scanner function, a printer function, a copy function and a facsimile function. The multifunction printer 100 is connected to a network server 12, a digital copying machine 13 as another peripheral equipment, and a host computer 11 through a network. The multifunction printer 100 is also connected to other communication devices through a public network. The multifunction printer should not be limited to the one shown in the drawing, but it may also be a digital copying machine, a printer with a copying function, and the like. The number of peripheral devices connected to the network should not be limited to the one as shown in the drawing.

The multifunction printer 100 is comprised mainly of a reader part 1, a printer part 2, and an image input/output control part 3. The reader part 1 is connected to the printer part 2 and the image input/output control part 3. The reader part 1 reads images on an original, and outputs the read image data to the printer part 2 or the image input/output control part 3. The printer part 2 prints the image data, which is output from the reader part 1 or the image input/output control part 3, on recording paper. The image input/output control part 3 connects to an external network and a public network, and inputs and outputs the image data. The image input/output control part 3 also stores the usage conditions of the multifunction printer 100 when a user uses it, and performs other processing. The image input/output control part 3 also analyzes and controls jobs (e.g., printing commands) from the host computer 11 connected to the network.

The image input/output control part 3 is comprised of a facsimile part 4, a file part 5, a network interface part 7, a LIPS formatter part 8 of LIPS (LBP Image Processing System) as one sort of PDLs of Canon Inc., a PS formatter part 9 of "Post Script" as one sort of PDLs of Adobe, and a core part 10. The facsimile part 4 is connected to the core part 10 and the public network. The facsimile part 4 expands the compressed image data received from the public network, and transmits the expanded image data to the core part 10. The facsimile part 4 also compresses image data transmitted from the core part 10, and transmits the compressed image data through the public network. The file part 5 is connected to the core part 10 and a magneto-optical drive unit 6 with a built-in magneto-optical disk. The file part 5 compresses image data transmitted from the core part 10, and stores the compressed image data with keywords for use in the retrieval of the compressed image data in the magneto-optical disk of the magneto-optical disk drive unit 6. The file part 5 also retrieves the compressed image data stored in the magneto-optical disk according to the keywords transmitted from the core part 10, and then reads and expands the compressed image data. The file part 5 then transmits the expanded image data to the core part 10.

The network interface part 7 is an interface between the host computer 11 and the following elements: the host computer 11, the digital copying machine 13 and the network server 12 which are connected to the network interface part 7 through the external network. Job control data is received from the host computer 11 through the network interface part 7, and image data and the like are transmitted to the host computer 11 through the network interface part 7. The job control data includes job control commands, which are transmitted with PDL data. An example of the job control data is a command for developing the PDL data and printing the same as image data and then stapling and discharging the printed image data. A database called an MIB (Management Information Base) is constructed in the network interface part 7, which communicates with the host computer 11 on the network using SNMP (Simple Network Management Protocol) to thereby manage the printer part 2.

The LIPS formatter part 8 and the PS formatter part 9 are connected to the core part 10, and develop the PDL data, which is transmitted from the host computer 11, into image data that can be printed by the printer part 2.

The core part 10 controls data and the like transmitted between the reader part 1, the facsimile part 4, the file part 5, the network interface part 7, the LIPS formatter part 8 and the PS formatter part 9. The core part 10 also analyzes the job control data, and stores the user's usage conditions and the like.

The host computer 11 is a personal computer or a workstation (PC/WS). A CPU (not shown) in the host computer 11 controls the computer to develop history information acquired by a later-described history information acquisition job into a paper discharge counter table for every operating mode. The CPU controls the computer to store the developed table in a storage device such as a hard disk (not shown). The network server 12 controls the whole network, and the digital copying machine 13 has a facsimile function.

Figure 2:
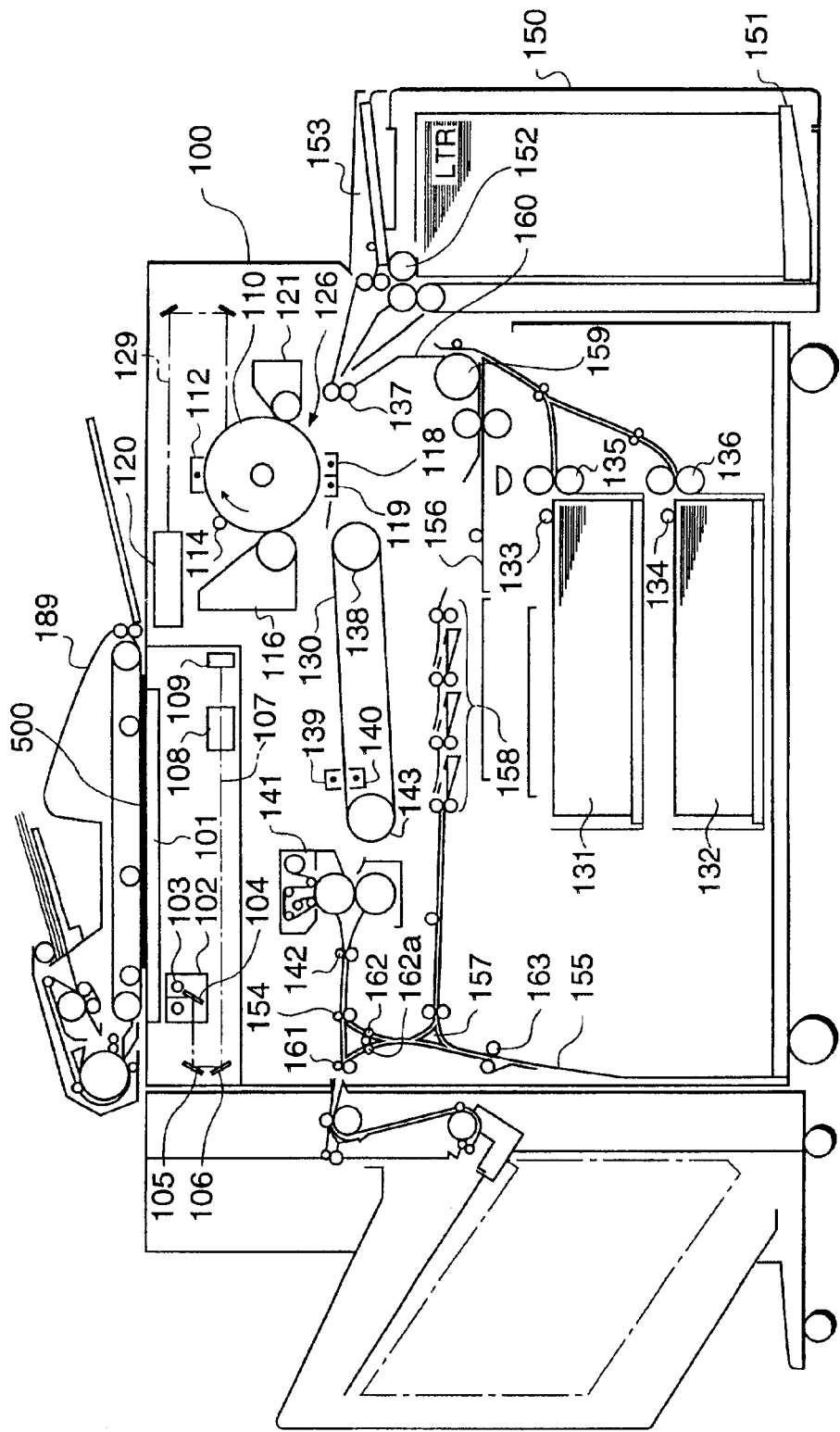
FIG. 2 is a schematic cross-sectional view schematically showing the structure of a multifunction printer 100 appearing in FIG. 1.

Referring next to FIGS. 2–5, there will be described the multifunction printer 100 in FIG. 1. FIG. 2 is a schematic cross-sectional view showing the structure of the multifunction printer 100 in FIG. 1. In FIG. 2, reference numerals 101 through 109 correspond to the reader part 1 in FIG. 1, and reference numerals 110 through 163 correspond to the printer part 2 in FIG. 1.

As shown in FIG. 2, a recirculating original feeder (RDF) 189 and an operating part 500 are disposed at the top of the multifunction printer 100. A platen glass 101 as an original mounting table is arranged under the RDF 189. A scanner 102 is comprised of an original illumination lamp 103, a scanning mirror 104, and the like. A motor (not shown) causes the scanner 102 to reciprocate in a predetermined direction. Reflected light 107 from the original is transmitted from a lens 108 through scanning mirrors 104–106 to form an image on a CCD sensor 109.

An exposure control part 120 is comprised of a laser, a polygon scanner, and others. The exposure control part 120 irradiates, on a light-sensitive drum 110, laser light 129, which is converted into an electric signal by the CCD sensor and modulated according to an image signal that is image-processed in a predetermined manner. A primary electrifier 112, a developing machine 121, a transfer electrifier 118, a cleaning device 116 and a pre-exposure lamp 114 are disposed around the light-sensitive drum 110. In an image formation part 126, a motor (not shown) causes the light-sensitive drum 110 to rotate in a direction indicated by an arrow in FIG. 2. After the primary electrifier 112 electrifies the light-sensitive drum 110, the laser light 129 from the exposure control part 120 is irradiated on the light-sensitive drum 110 to thereby form an electrostatic latent image.

The electrostatic latent image formed on the light-sensitive drum 110 is developed by the developing machine 121 to be visualized as a toner image. On the other hand, pickup rollers 133 and 134 feed transfer paper from an upper cassette 131 or a lower cassette 132, and paper feeding rollers 135 and 136 feed the transfer paper to a main body of the multifunction printer 100. A resist roller 137 then feeds the transfer paper to a transfer belt 130, and a transfer electrifier 118 transfers the visualized toner image onto the transfer paper. After the transfer, the cleaning device 116 cleans up the residual toner on the light-sensitive drum 110, and the pre-exposure lamp 114 erases the residual electric charge.

The transfer paper with the tone image transferred thereon is separated from the transfer belt 130. Pre-fixing electrifiers 139 and 140 re-electrify the image onto the toner. The transfer paper is then fed to a fixing device 141, and is fixed by pressing and heating. A paper discharging roller 142 discharges the transfer paper to the outside of the main body of the multifunction printer 100.

An absorption electrifier 138 absorbs the transfer paper, which is fed from the resist roller 137, onto the transfer belt 130. A transfer belt roller 143 is used for rotating the transfer belt 130, and at the same time, cooperates with the absorption electrifier 138 to absorb and electrify the transfer paper onto the transfer belt 130.

The main body of the multifunction printer 100 is equipped with a deck 150, which is able to contain, e.g., four-thousand sheets of transfer paper. A lifter 151 of the deck 150 lifts according to the volume of the transfer paper so that the transfer paper can always be in contact with a paper feeding roller 152. The main body of the multifunction printer 100 is also equipped with a multi manual paper feeder 153, which is capable of containing one-hundred sheets of transfer paper. A paper discharging flapper 154 is used to switch a path at the paper discharge side to a double recording side or a multiple recording side. The transfer paper discharged by the paper discharging roller 142 is switched to the double recording side or the multiple recording side by the paper discharging flapper 154.

A multiple flapper 157 is used to switch the path at the double recording side and the path at the multiple recording side. Putting the multiple flapper 157 down to the left guides the transfer paper directly to a transfer path 158 without going through an inversion path 155. A paper feeding roller 159 is used to feed the transfer paper to the light-sensitive drum 110 through a path 160. A paper discharging roller 161 is arranged in close proximity to the paper discharging flapper 154, and is used to discharge the transfer paper, which is switched to the discharge side by the paper discharging flapper 154, to the outside of the main body.

In the double-side recording (double-side copying), the paper discharging flapper 154 is moved up and the multiple flapper 157 is put down to the right, and the copied transfer paper is fed through the inversion path 155. The multiple flapper 157 is then put down to the left, and the transfer paper is turned inside out via the transfer path 158 and is stored in a paper refeeding tray 156. In the multiple recording (multiple copying), the paper discharging flapper 154 is moved up and the multiple flapper 157 is put down to the left, and the copied transfer paper is stored in a paper refeeding tray 156 via the transfer path 158. The transfer paper contained in the paper refeeding tray 156 is guided sheet by sheet to the resist roller 137 of the main body through the path 160 by the paper feeding roller 159.

To invert and discharge the transfer paper from the main body of the multifunction printer 100 (discharge the paper with the reverse side facing upward), the paper discharging flapper 154 is moved up and the multiple flapper 157 is put down to the right, and the copied transfer paper is transported toward the inversion path 155. When the rear end of the transfer paper passes a first feeding roller 162, an inversion roller 163 transports the transfer paper to a second feeding roller 162a. A discharging roller 161 then turns the transfer paper inside out, and discharges it to the outside of the main body.

Figure 3:
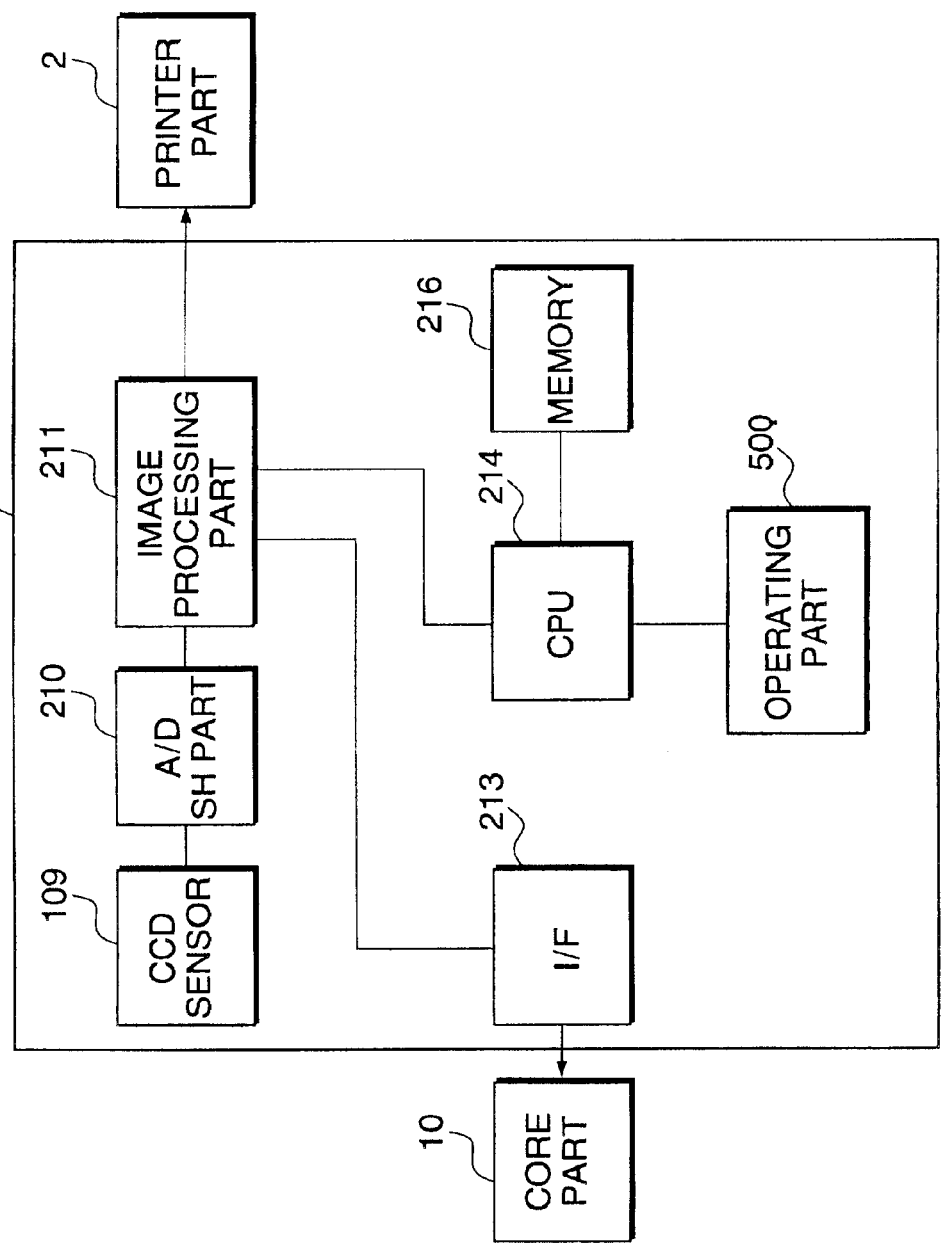
FIG. 3 is a block diagram showing the structure of a reader part 1 appearing in FIG. 1.

FIG. 3 is a block diagram showing the structure of the reader part 1 in FIG. 1. In FIG. 3, the CCD sensor 109 is connected to an image processing part 211 through an A/D SH part 210. The image processing part 211 is connected to the core part 10 through an interface part (I/F) 213, and is also connected to the printer part 2 and a CPU 214. The CPU 214 is connected to a memory 216 and an operating part 500.

The CCD sensor 109 outputs the image data representing the image on the original to the A/D SH part 210. The image data is analog-to-digital (A/D) converted and is shading-corrected at the A/D SH part 210. The processed image data is transmitted to the printer part 2 through the image processing part 211, and is also transmitted to the core part 10 of the image input/output control part 3 through the I/F 213.

The CPU 214 controls the image processing part 211 and the I/F 213 according to commands designated by the user through the operating part 500. For example, if the designated command is a copying mode for copying after trimming the image data, the CPU 214 controls the image processing part 211 to trim the image data and transfer the trimmed image data to the printer part 2. If the designated command is a facsimile transmission mode, the CPU 214 controls the I/F 213 to transfer a control command conforming to the image data and the designated operating mode to the core part 10. A control program executed by the CPU 214 is stored in the memory 216, and the CPU 214 controls various parts with reference to the memory 216. The memory 216 is also used as a working area for the CPU 214.

Figure 4:
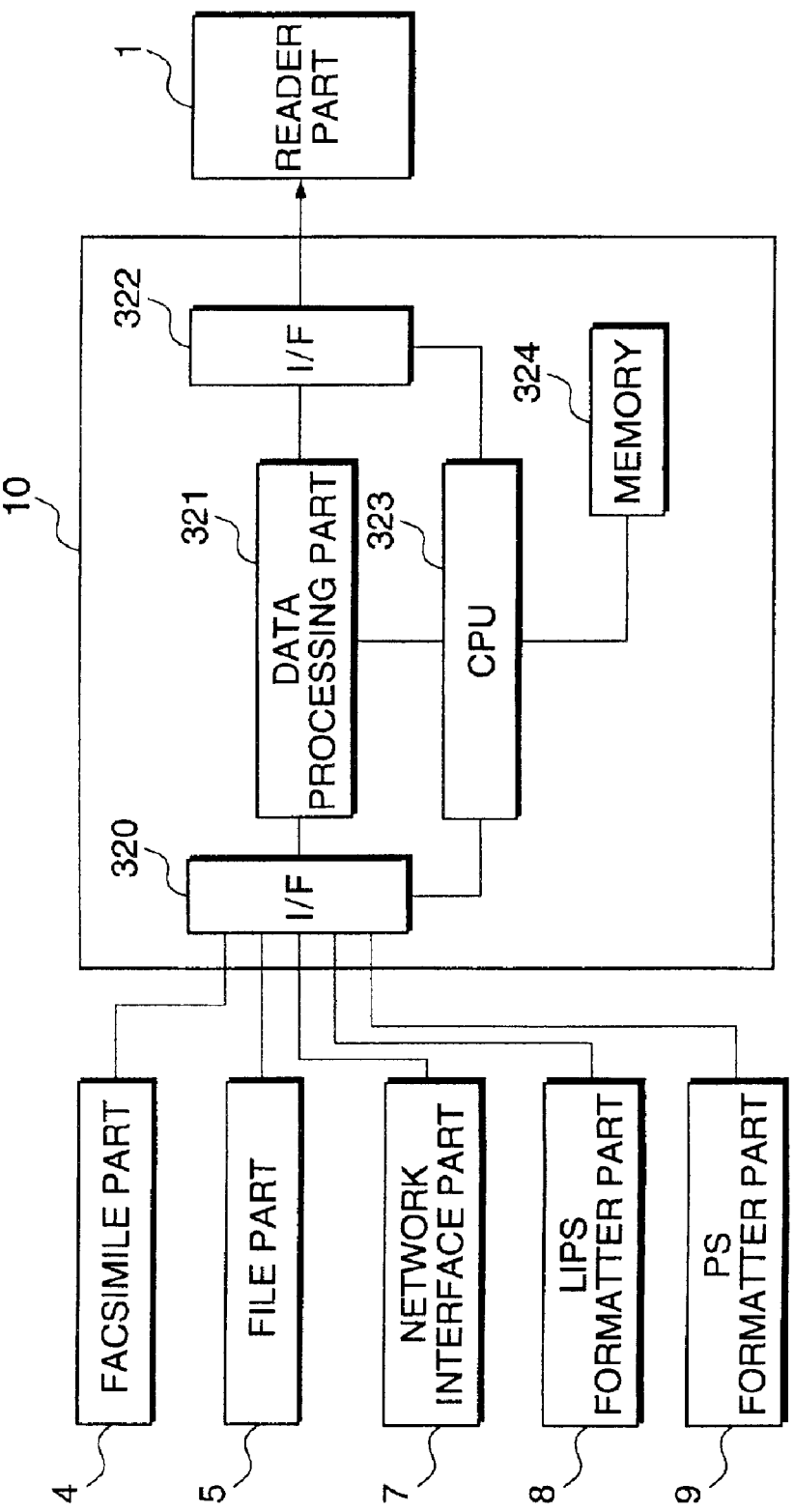
FIG. 4 is a block diagram showing the structure of a core part 10 appearing in FIG. 1.

FIG. 4 is a block diagram showing the structure of the core part 10 in FIG. 1. In FIG. 4, an I/F 320 is connected to a data processing part 321, and is also connected to the facsimile part 4, the file part 5, the network interface part 7, the LIPS formatter part 8 and the PS formatter part 9 which are at the outside. The data processing part 321 is connected to the reader part 1 through an I/F 322. A CPU 323 is connected to the I/F 320, the data processing part 321, the I/F 322 and a memory 324.

Image data input from the reader part 1 is transmitted to the data processing part 321 through the I/F 322. The control commands input from the reader part 1 are transmitted to the CPU 323 through the I/F 322. The data processing part 321 processes the image data. For example, the image processing part 321 rotates the image data and varies the magnification of the image. The image data processed by the data processing part 321 is transmitted to the facsimile part 4, the file part 5, or the network interface part 7 according to the control command from the reader part 1.

PDL code data representing the image input from the network interface part 7 is transmitted to the data processing part 321 through the I/F 320, and is determined as being LIPS data or post script data. As a result of the determination, the code data is transmitted to the LIPS formatter part 8 or the PS formatter part 9, and is developed as bitmap image data. The developed bitmap image data is transmitted to the data processing part 321 through the I/F 320, and is transferred to the facsimile part 4 or to the printer part 2 via the reader part 1 according to the control command.

Image data output from the facsimile part 4 or the file part 5 is transmitted to the data processing part 321 through the I/F 320, and is transferred to the file part 5 or the network interface part 7, or to the printer part 2 via the reader part 1, according to the control command.

The CPU 323 controls the above various parts according to the control program stored in the memory 324 and the control commands transmitted from the reader part 1. The memory 324 is also used as a working area for the CPU 323.

As stated above, the core part 10 mainly takes part in controlling the processing such as reading of the original image, printing of the original image, sending and receiving of the image data, the storage of the image data, input/output of the image data from the host computer 11, and the like.

Figure 5:
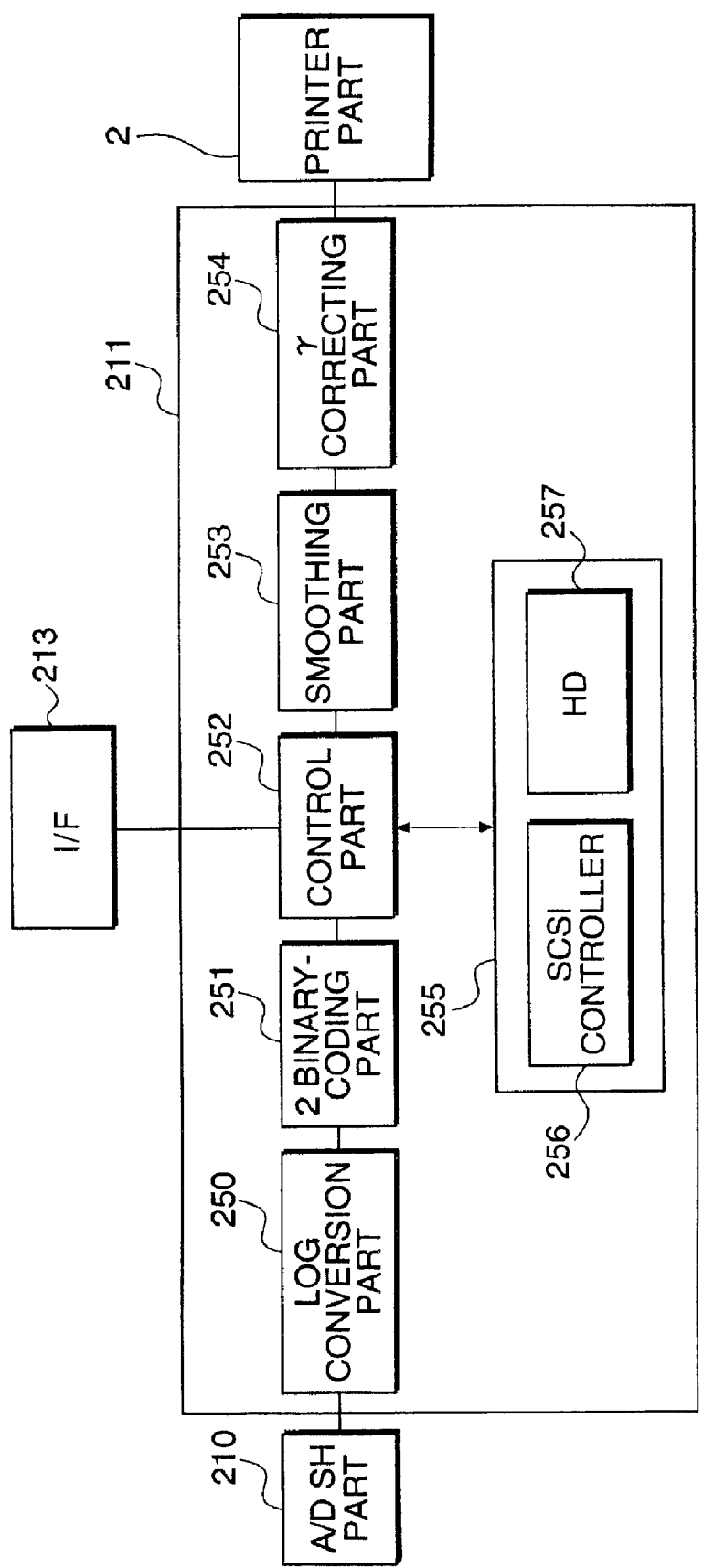
FIG. 5 is a block diagram showing the detailed structure of an image processing part 211 appearing in FIG. 3.

FIG. 5 is a block diagram showing the detailed structure of the image processing part 211 in FIG. 3. In FIG. 5, a log conversion part 250 connected to the A/D SH part 210 is connected to a control part 252 through a binary-coding part 251, which, in turn, is connected to the printer part 2 through a smoothing part 253 and a g-correcting part 254. The control part 252 is further connected to an image storage part 255 and the I/F 213.

The image data processed by the A/D SH part 210 is input as black intensity data to the log conversion part 250. The log conversion part 250 contains a LUT (Look Up Table: a table containing positions, addresses or the like of data which is indirectly referred to) for converting the input intensity data into density data. The LUT converts the intensity data into the density data by means of table values of the density data corresponding to the intensity data. The multivalued density data is transmitted to the binary-coding part 251, and is binary-coded into a numerical value of "0" or "255". The binary-coded 8-bit density data is converted into 1-bit image data of "0" or "1", and thus, the memory 216 needs to contain only a small amount of data. The density data, which is binary-coded by the binary-coding part 251, is transmitted to the control part 252.

When the density data is binary-coded, the number of graduations of the image is thus changed from 256 to 2. Therefore, the quality of an image such as a photographic image composed of image data with a large number of half tones is significantly deteriorated. To address this problem, the binary-coded data must be falsely corrected to be represented by half tones by an error diffusion method or the like. According to the error diffusion method, image data is binary-coded into density data of "255" if the density of the image is higher than a predetermined threshold level, and image data is binary-coded into density data of "0" if the density of the image is smaller than the predetermined threshold level. Then, differences or errors between the actual density data and the binary-coded data are allocated as error signals to surrounding pixels. To allocate the errors, the errors resulting from the binary-coding operation are multiplied by predetermined weighting factors on a prepared matrix, and are added to the surrounding pixels. Consequently, an average density value of the whole image is stored, and the half tones can be falsely represented by binary codes.

The PDL data, which is transmitted from the host computer 11 and is developed into the bitmap image data, has already been converted into binary-coded density data by the LIPS formatter part 8 or the PS formatter part 9. Thus, the PDL data is transmitted as it is to the control part 252.

The control part 252 stores image data of an original, which is read on the RDF 189 or the platen glass 101 and is transmitted through the A/D SH part 210, or the bitmap image data developed from the PDL from the I/F 213, in the image storage part 255, and reads and outputs the stored image data.

The image storage part 255 has an SCSI controller 256 and a hard disk (HD) 257 as a storage device, and stores the image data in the HD 257 in accordance with a command from the SCSI controller 256. Plural pieces of image data stored in the HD 257 are used during printing in an order conforming to an editing mode designated at the operating part 500. The plural pieces of image data are also used for printing and electronically sorting the PDL sent from the host computer 11 in a reverse order from a top page. More specifically, the plural pieces of image data are also used for temporarily storing all pages of the bitmap image converted from the PDL data in the HD 257, then sequentially reading the image from the HD 257 from the last page to the top page and printing them, and repeating the above processing a number of times required by the host computer 11 to thereby perform the electronic sorting.

The image data, which is read from the image storage part 255, and the image data, which is not stored in the image storage part 255, are transmitted to the smoothing part 253. The smoothing part 253 converts the 1-bit image data of "0" or "1" into 8-bit image data to bring signals of the data into the state of "0" or "255". The converted image data is substituted by a weighted average value, which is found by respectively multiplying predetermined factors on a matrix by density values of neighborhood pixels and then adding all the resulting values. Therefore, the binary-coded data is converted into multivalued density data according to the density values of the neighborhood pixels, and this enables the reproduction of an image, which is close in quality to the read image.

The smoothed image data is input to the g-correcting part 254. To output the density data, the g-correcting part 254 converts the density data by the LUT, which is produced by taking the characteristics of the printer into consideration, and adjusts the output according to a density value designated at the operating part 500. The processed image is transferred to the printer part 2, and is printed.

Figure 6:
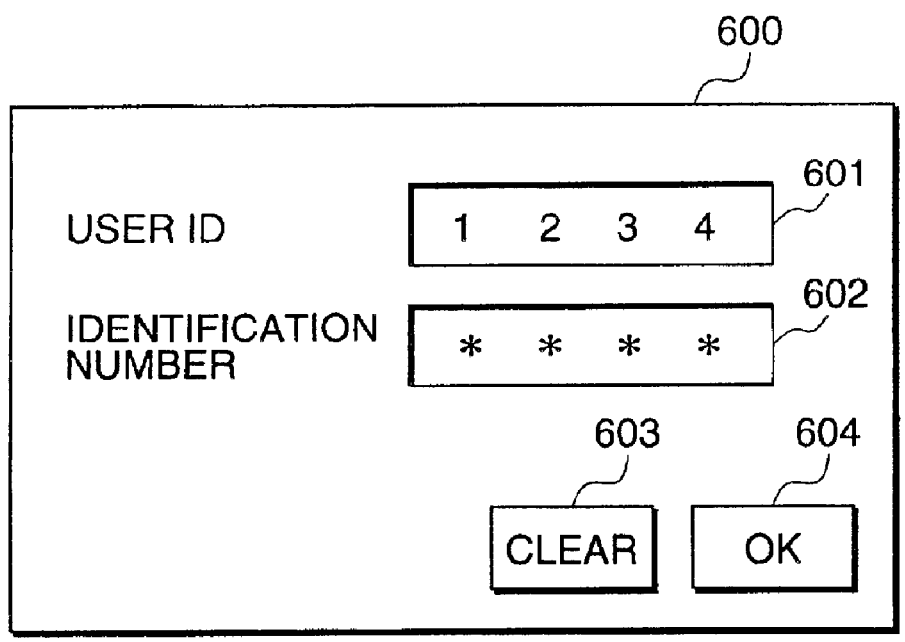
FIG. 6 is a view showing an initial screen displayed at a liquid crystal display panel on an operating part 500 of the multifunction printer 100 in FIG. 1.
Figure 7:
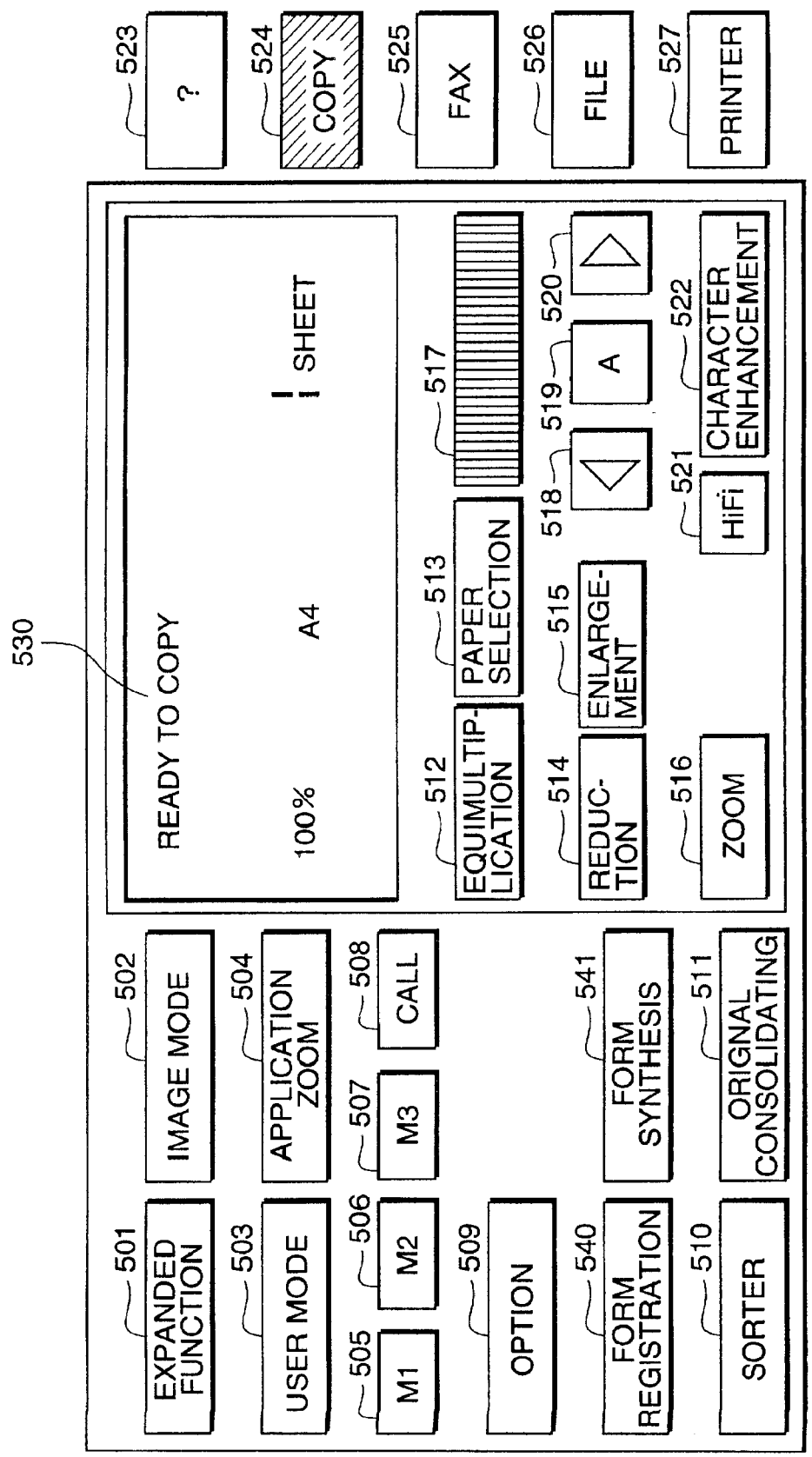
FIG. 7 is a view showing a basic screen displayed after authentication of a user ID and a personal identification number on the initial screen in FIG. 6.

Referring next to FIGS. 6 and 7, there will be described the inputting operation at the operating part 500 of the multifunction printer 100 in FIG. 1. FIG. 6 is a view showing an initial screen displayed at a liquid crystal display panel on the operating part 500 of the multifunction printer 100 in FIG. 1. The screen of the liquid crystal display panel is a touch panel. A function is executed by touching an area within a frame of a displayed function.

In FIG. 6, an initial screen 600 of the liquid crystal display panel is displayed after a power supply of the multifunction printer 100 is turned on. The user is authenticated on the initial screen 600. A user ID input key 601 on the initial screen 600 is used for the user to input his or her user ID. After touching an area within a frame of the key 601, the user inputs the user ID of four-digit numerical values from a ten key (not shown). A personal identification number input key 602 is used for the user to input his or her personal identification number. After touching an area within a frame of the key 602, the user inputs a personal identification number corresponding to his or her personal identification number of four digit numerical values from the ten key. A clear key 603 is used for canceling the numerical values input through the user ID input key 601 or the personal identification number input key 602. An OK key 604 is used for fixing the user ID input through the user ID input key 601 and the personal identification number input through the personal identification number input key 602. When the OK key 604 is touched, a combination of the input user ID and personal identification number is collated with a combination of a user ID and a personal identification number stored in the memory 216 of the reader part 1. If they are found to be in conformity as a result of the collation, all the operations including the copying, the printing and others in the multifunction printer 100 are enabled and the initial screen is switched to a basic screen in FIG. 7, which will be described later. If they are not in conformity, a sentence such as "the authentication did not succeed" (not shown) is displayed and then the initial screen in FIG. 6 is displayed again. This authentication function prevents an improper use of the multifunction printer 100 and acquires a user ID for specifying a user who used the multifunction printer 100.

FIG. 7 is a view showing the basic screen which is displayed after authentication of the user ID and the personal identification number on the initial screen in FIG. 6. In FIG. 7, an expanded function key 501 is used for setting duplex/duplex copy, double-side copy, multiple copy, movement, binding, border erase, and other functions with respect to an image to be copied. Touching the key 501 starts a setting mode. An image mode key 502 is used for setting half-tone dot meshing, shading, trimming and masking with respect to an image to be copied. A user mode key 503 is used for setting a user's operational environment such as ON/OFF of a buzzer, ON/OFF of a cassette automatic selection and an automatic density adjusting method.

An application zoom key 504 is used for entering a mode of varying the magnification of an original in an X-direction and a Y-direction, respectively, and entering a zoom program mode of calculating the magnification according to an original document size and a copy size. An M1 key 505, an M2 key 506 and an M3 key 507 are pressed to call respective mode memories which are registered in advance. A registration key 508 is used for registering a current copy mode in a corresponding mode memory. An option key 509 is used for setting an optional function such as a film projector, which copies an image directly from an exposed film. The option key 509 is also used for a desired key.

A sorter key 510 is used for setting whether to use a mechanical sorter or an electronic sorter, and setting a mode for sorting and grouping by the sorter. An original consolidating key 511 is used for consolidating and setting originals in different sizes such as A4 and A3, or B5 and B4 on an original feeder. An equimultiplication key 512 is used for setting a copying magnification at 100%. A reduction key 514 and an enlargement key 515 are used for setting the reduction ratio and enlargement ratio to respective predetermined ratios. A zoom key 516 is used for setting the reduction and enlargement ratio within a range between 25% and 800%. A paper selection key 513 is used for selecting copying paper. Density keys 518 and 520 are used for adjusting the image density during copying. Every depression of the density key 518 increases the image density, and every depression of the density key 520 decreases the image density. A density display 517 informs the user of the adjustment of the density by moving its display to the right or to the left every time the density key 518 or 520 is pressed. An AE key 519 is used for copying an original such as newspaper which is in a thick color by automatically adjusting the density.

A HiFi key 521 is used for copying an original such as a photograph with half tones of a high density. A character enhancement key 522 is used for enhancing characters in the copy of a character original. A guide key 523 is used to display the descriptions about a key when the function of the key is unknown. A copy key 524 starts the copying operation upon depression. A facsimile key 525 is used for transmitting the image of an original via facsimile. A file key 526 is depressed when file data is desired to be output. A printer key 527 is used for changing the density of a print and referring to the printed result of the PDL image data from the remote host computer 11. A form registration key 540 is used for storing originals set on the RDF as form images in a form region of the HD 257. A form synthesis key 541 is used for selecting a plurality of form images stored in the form region of the HD 257 and finding an OR of these form images and the originals set on the RDF to print the resulting form images. Upon completion of the copying operation, a usage ending key 550 (not shown) is pressed to display the initial screen in FIG. 5 again so that another user can use the multifunction printer 100.

To transmit the PDL data from the host computer 11 to the multifunction printer 100 to print it, the same initial screen as in FIG. 6 is displayed on a monitor screen or the like of the host computer 11 so that the user can input the user ID and the personal identification number. The data of the input user ID and identification number is transmitted to the multifunction printer 100 through the network, and are collated with a combination of a user ID and a personal identification number stored in the memory 216. The multifunction printer 100 transmits the collation result to the host computer 11. If the user is authenticated as a result of the collation, the host computer 11 transmits the PDL data to the multifunction printer 100 to print it. If the user is not authenticated, the host computer 11 does not transmit the PDL data.

If the multifunction printer 100 is used directly by the user and if the multifunction printer 100 is used through the host computer 11, the user ID input by the user, the usage conditions of the operating mode for copying, printing or the like and the number of discharged sheets in printing or the like are calculated as history information in a record as shown in FIGS. 8A and 8B, hereinafter referred to, and are stored in a predetermined region of the memory 216.

FIG. 8A is a schematic diagram showing one record of the history information stored in the multifunction printer 100 in FIG. 1. FIG. 8B is a view showing an example of the record of FIG. 8A. In FIG. 8A, record information 700 is comprised of contents 701 as history information and the number of bytes 702 allocated to the contents 701. The contents 701 include an occurrence time indicative of a time when a user uses the multifunction printer 100, a user ID of a user who used the multifunction printer 100, a used paper size (e.g., A3 or A4), a printing mode indicative of one-side printing or double-side printing, a used toner color (black-and-white, monochromatic color, or full color), a used paper type (e.g., plain paper, or OHP), and the number of discharged sheets. The number of bytes indicates the memory capacity required for storage.

FIG. 8B shows a concrete example of the record of FIG. 8A. In FIG. 8B, a user with a user ID of 0002 inputs a personal identification number and succeeds in authentication, and produces ten prints in an operating mode of A4 size, one side, black-and-white copy and plain paper at 13:35 on Dec. 10, 1998. Thus, the image processing part 211 receives signals representing the paper size, the printing mode, the toner color and the paper type, and the CPU 214 records and stores the signals in a format of the record information 700 in FIG. 8A in the predetermined region of the memory 216.

Figure 9:
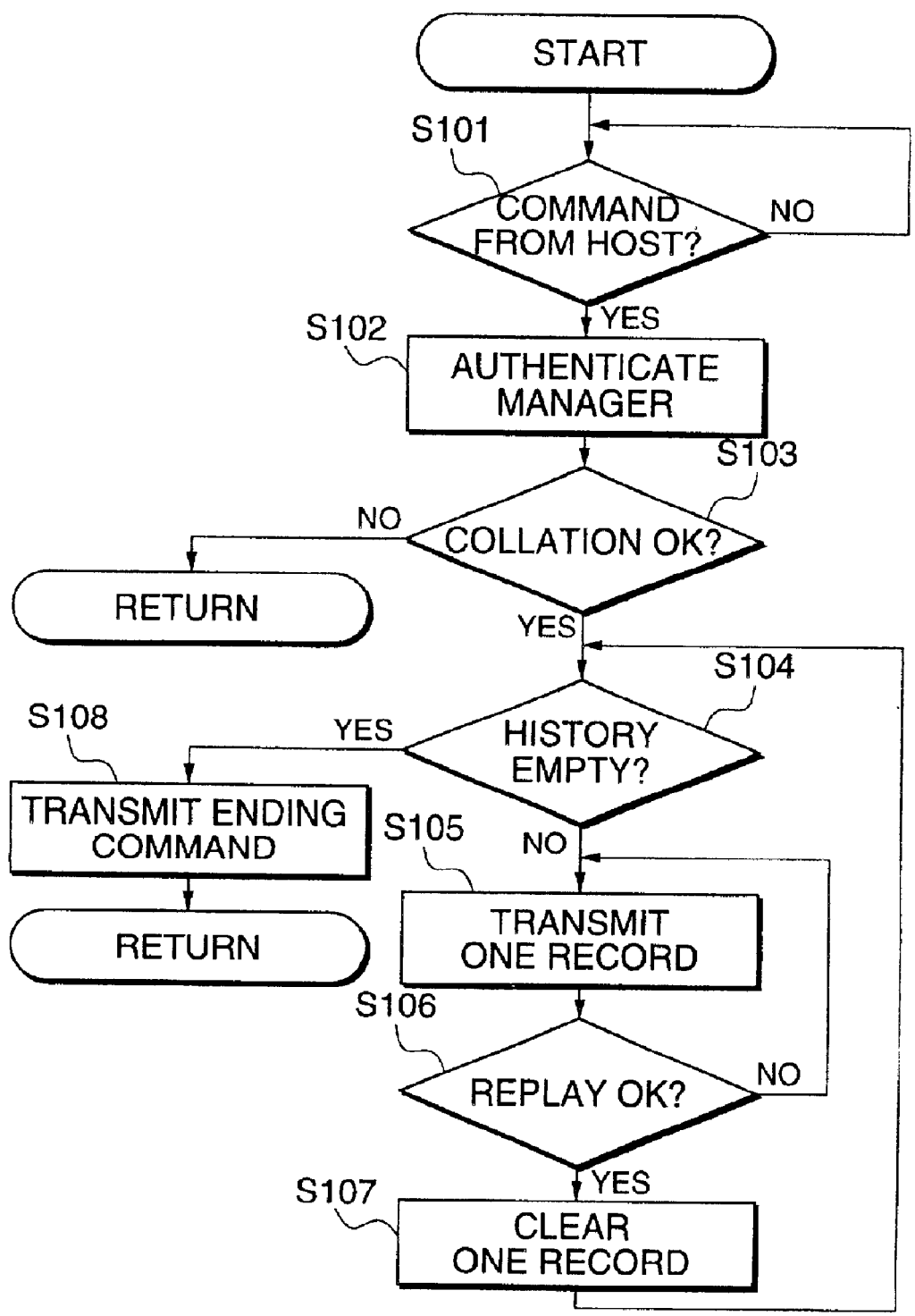
FIG. 9 is a flow chart showing the procedure for transmitting the history information stored in the multifunction printer 100 in FIG. 1.

FIG. 9 is a flow chart showing the procedure for transmitting the history information stored in the multifunction printer 100 in FIG. 1. In FIG. 1, it is determined whether a command for a history information acquisition job has been received from the host computer 11 (step S101), and the step S101 is repeated until this command is received. When the command for the history information acquisition job is received from the host computer 11, a combination of a manager's ID and personal identification number transmitted with the history information acquisition job is collated with a combination of a manager's ID and personal identification number stored in the memory 216 of the reader part 1 in order to authenticate a manager (step S102). This prevents an improper access by people other than a system manager.

Next, the user ID and the personal identification number input from the host computer 11 are collated with the ones stored in the memory 216 to determine whether the collation is OK or not (step S103). If the collation is not OK, the process returns to the first step in the procedure. On the other hand, if the collation is OK, it is determined whether the history information stored in the memory 216 is empty or not (step S104). If the history information is stored and is not empty, the history information of one record as shown in FIG. 8A is transmitted to the host computer 11 through the CPU 214, the image processing part 211, the core part 10 and the network interface part 7 (step S105) (transmission means).

The CPU 323 of the core part 10 determines whether or not the host computer 11 has correctly received the transmitted history information of one record, i.e., whether or not the CPU 323 has received an OK reply from the host computer 11 (step S106). The steps S105 and 106 are repeated until the CPU 323 receives the OK reply.

If the CPU 323 receives the OK reply as a result of the determination in the step S106, the CPU 323 clears the predetermined region of the memory 216 containing the transmitted history information of one record (step S107). Then, the process returns to the step S104.

On the other hand, if the history information recorded in the memory 216 becomes empty as a result of the determination in the step S104, the CPU 323 of the core part 10 transmits an ending command to the host computer 11 through the network interface part 7 (step S108), and this process is terminated.

When the number of records of the history information stored in the memory 216 reaches 80 (i.e., when the amount of the history information reaches 80% of the storable memory capacity), the CPU 214 of the reader part 1 notifies the CPU 323 of the core part 10 of this fact through the image processing part 211 and the I/F 213. The CPU 323 notifies the host computer 11 of this fact as a history information warning event through the network interface part 7 (notifying means).

When the number of records of history information stored in the memory 216 reaches 100 (i.e., when the amount of history information reaches 100% of the storable memory capacity), the CPU 214 notifies the CPU 323 of the core part 10 of this fact. The CPU 323 then notifies the host computer 11 of this fact as a history information full event through the network interface part 7 (notifying means). Upon receipt of this notification, the host computer 11 may transmit the history information acquisition job to the multifunction printer 100 to acquire the history information from the multifunction printer 100 in the procedure shown in FIG. 9.

Figure 10:
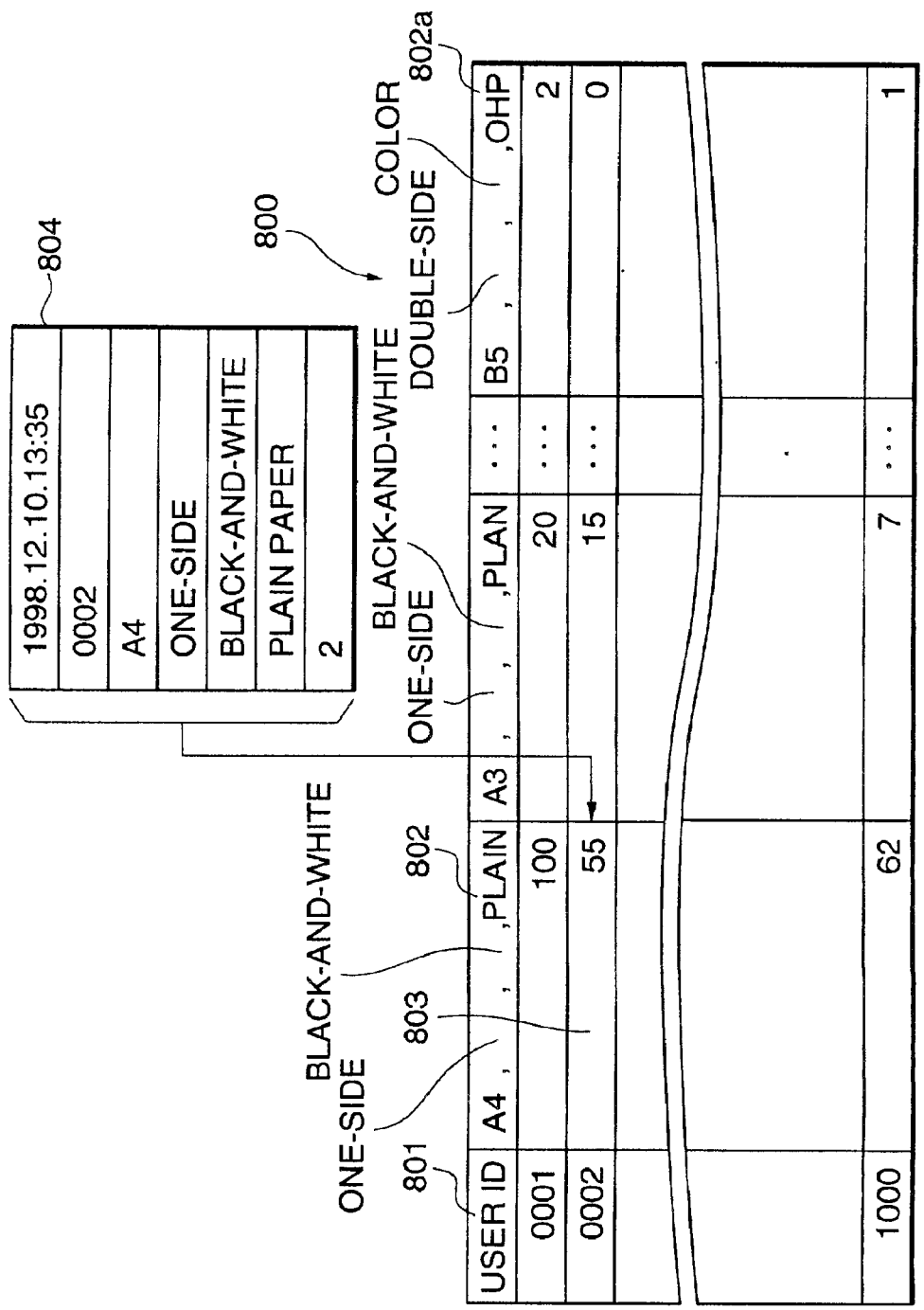
FIG. 10 is a schematic diagram showing a paper discharge counter table for every operating mode, which exhibits history information in a host computer 11 appearing in FIG. 10.

Referring next to FIG. 10, there will be described the management of the history information acquired by the host computer 11. FIG. 10 is a schematic diagram showing a paper discharge counter table for each operating mode, which is produced by developing the history information acquired by the host computer 11 in FIG. 1. In FIG. 10, a paper discharge counter table 800 for each operating mode is comprised of a user ID column 801 and counter columns 802 . . . 802a.

In the user ID column 801, one-thousand users are managed by user IDs from 0001 to 1000. The number of user IDs to be managed should not be limited to the one in the figure. The number of user IDs depends on the memory capacity of the host computer 11, the designated specification of the manager, and the like. The counter columns 802 . . . 802a are provided for different operating modes. If the user produces prints in an operating mode of A4, one-side, black-and-white and plain paper, the number is counted up in "A4, one-side, black-and-white, plain paper" of the counter column 802. When the user produces prints in an operating mode of B5, double-side, color and OHP, the number is counted up in "B5, double-side, color, OHP" of the counter column 802a.

In the counter columns, ten sizes of A3, A4, A5, B4, B5, LTR, LDR, STMT, postcard and envelop can be designated as the paper size; two printing modes of one-side printing and double-side printing can be designated as the printing mode; three colors of full color, monochromatic color and black-and-white color can be designated as the toner color; and five paper types of plain paper, OHP, label paper, recycled paper and thick paper can be designated as the paper type. Combinations thereof are stored in 10×2×3×5= 300 kinds of counter columns in the counter columns 802 . . . 802a. The required memory capacity in the host computer 11 is 1,000 users×300 kinds×4 bytes=1,200,000 bytes if four bytes are used in one column of a counter number 803.

The counter number 803 is used for counting how many times an operating mode written in the top counter column has been executed. FIG. 10 shows an example wherein a user with a user ID of 0002 has 55 discharged black-and-white and one-sided prints of plain paper in the A4 size.

History information 804 is one record of history information acquired by the host computer 11 from the multifunction printer 100. In an example of FIG. 10, the history information 804 indicates that the user with the user ID of 0002 has produced two prints (discharged two sheets of paper) in an operating mode of A4, one-side, black-and-white and plain paper. When the host computer 11 acquires one record of history information, the number of discharged sheets is added to a counter column corresponding to the acquired history information (in the example of FIG. 10, 2 is added to the counter number 803, and therefore, the counter number is increased from 55 to 57). This enables the development of a detailed counter table for every user ID and every operating mode such as the paper discharge counter table 800 for every operating mode, based on history information acquired from the multifunction printer 100, and makes it possible to efficiently charge the users.

Moreover, it is possible to manage the detailed counter table for every user and every operating mode only by providing the multifunction printer 100 with a memory area for a small amount of history information of 100 records (about 1,500 bytes) without providing the multifunction printer 100 with a large counter table of 1,200,000 bytes.

The operating mode may be determined by data related to kinds of jobs performed by a copying machine, a facsimile machine, a printer, etc.

According to the present embodiment, as described above, in the multifunction printer 100, the user ID of a user who used the multifunction printer 100, the operating mode of the multifunction printer 100 and the number of sheets discharged from the multifunction primer 100 are stored as the history information 804 in the memory 216. According to the command for the history information acquisition job from the host computer 11 (step S101), the history information 804 is transmitted to the host computer 11 (step S105). In the host computer 11, the history information 804 acquired from the multifunction printer 100 is developed and managed as the paper discharge counter table 800 for every operating mode. Therefore, the usage conditions of the multifunction printer 100 can be stored with respect to every user or every operating mode without increasing the cost by expanding the memory capacity of the multifunction printer 100, and the usage conditions can be finely calculated and managed to charge the users.

According to the peripheral device control system that has been described in detail, the history information storage means of the peripheral device stores the history information including a user ID of a user who used the peripheral device, an operating mode of the peripheral device and the number of sheets discharged from the peripheral device. The information processing apparatus transmits the history information acquisition job to the peripheral device, and the history information acquisition means thereof acquires the history information stored by the history information storage means according to the history information acquisition job. The storage means of the information processing apparatus stores the history information acquired by the history information acquisition means as the paper discharging counter for every operating mode of the peripheral device. This makes it possible to store the predetermined usage conditions of the peripheral device for every user or every operating mode without increasing the memory capacity of the peripheral device.

The operating mode includes at least one of the paper size, the one-side/double-side printing mode, the toner color, and the paper type. It is therefore possible to finely store the predetermined usage conditions of the peripheral device.

In the peripheral device, the job receiving means receives the history information acquisition job transmitted from the information processing apparatus, and the transmission means transmits the stored history information according to the history information acquisition job received from the job receiving means. It is therefore possible to transmit the history information from the peripheral device to the information processing apparatus without fail.

In the peripheral device, the notification means notifies the information processing apparatus of an amount of history information stored by the history information acquisition means. Therefore, the information processing apparatus can acquire the history information in a proper timing.

The notification means notifies the information processing apparatus when the amount of the stored history information reaches a predetermined amount. This prevents the history information from using up the memory capacity of the peripheral device.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An image forming device control system comprising:
    an image forming device including history information storage means for storing history information relating to image processing executed a plurality of times by said image forming device, wherein said history information includes an operating mode, which includes a plurality of settings of said image forming device, and at least one of user identification information of a user who used said image forming device and a number of sheets discharged from said image forming device; and
    an information processing apparatus including history information acquisition means for transmitting a history information acquisition request to said image forming device and for acquiring said history information stored by said history information storage means, and storage means for storing said history information acquired by said history information acquisition means as a counter table prepared for each operating mode, which includes a plurality of settings of said image forming device, wherein said image forming device further includes transfer means for transferring said history information in accordance with said history information acquisition request to said image processing apparatus, and clearing means for clearing said history information relating to said image processing executed a plurality of times by said image forming device stored by said history information storage means when said history information is transferred to said information processing apparatus.

2. An image forming device control system according to claim 1, wherein said operating mode includes at least one of a paper size, a one-side/double-side printing mode, a toner color, and a paper type.

3. An image forming device control system according to claim 1, wherein said image forming device comprises:
acquisition receiving means for receiving said history information acquisition request transmitted from said information processing apparatus; and
transmission means for transmitting said stored history information according to said history information acquisition request received from said acquisition receiving means.

4. An image forming device control system according to claim 1, wherein said image forming device comprises notification means for notifying said information processing apparatus of an amount of said history information stored by said history information acquisition means.

5. An image forming device control system according to claim 1, wherein said notification means notifies said information processing apparatus when said amount of history information reaches a predetermined amount.

6. An image forming device control system according to any of claims 1 through 5, wherein said image forming device includes at least one of a printer function, a copying function, a facsimile function, and a scanner function.

7. An image forming device, which is connected to an information processing apparatus through a network, said image forming device comprising:
history information storage means for storing history information obtained by image processing executed a plurality of times by said image forming device, wherein said history information includes an operating mode, which includes a plurality of settings of said image forming device, and at least one of user identification information of a user who used said image forming device and a number of sheets discharged from said image forming device;
history information transmission means for transmitting said history information stored by said history information storage means to said image processing apparatus in response to a history information acquisition request transmitted from said information processing apparatus;
transfer means for transferring said history information in accordance with said history information acquisition request; and
clearing means for clearing said history information relating to said image processing executed a plurality of times by said image forming device stored by said history information storage means when said history information is transferred to said information processing apparatus.

8. An image forming device according to claim 7, wherein said operating mode includes at least one of a paper size, a one-side/double-side printing mode, a toner color, and a paper type.

9. An image forming device according to claim 7, further comprising:
acquisition receiving means for receiving said history information acquisition request transmitted from said information processing apparatus; and
transmission means for transmitting said stored history information according to said history information acquisition request received from said acquisition receiving means.

10. An image forming device according to claim 7, comprising notification means for notifying said information processing apparatus of an amount of said history information stored by said history information storage means.

11. An image forming device according to claim 10, wherein said notification means notifies said information processing apparatus when said amount of history information reaches a predetermined amount.

12. An image forming device according to claim 7, wherein said image forming device includes at least one of a printer function, a copying function, a facsimile function, and a scanner function.

13. An information processing apparatus connected to an image forming device having history information storage means for storing history information relating to image processing executed a plurality of times by said image forming device, wherein said history information includes an operating mode, which includes a plurality of settings of said image forming device, and at least one of user identification information of a user who used said image forming device and a number of sheets discharged from said image forming device, said information processing apparatus comprising:
history information acquisition means for transmitting a history information acquisition request to said image forming device and for acquiring said history information stored by said history information storage means according to said history information acquisition request;
storage means for storing said history information acquired by said history information acquisition means as a counter table prepared for each operating mode, which includes a plurality of settings of said image forming device;
transfer means for transferring said history information in accordance with said history information acquisition request; and
clearing means for clearing said history information relating to said image processing executed by a plurality of times by said image forming device stored by said history information storage means when said history information is transferred to said information processing apparatus.

14. An information processing apparatus according to claim 13, wherein said operating mode includes at least one of a paper size, a one-side/double-side printing mode, a toner color, and a paper type.

15. An information processing apparatus according to claim 13, wherein said image forming device comprises:
acquisition receiving means for receiving said history information acquisition request transmitted from said information processing apparatus; and
transmission means for transmitting said stored history information according to said history information acquisition request received from said acquisition receiving means.

16. An information processing apparatus according to claim 13, wherein said image forming device includes at least one of a printer function, a copying function, a facsimile function, and a scanner function.

17. A method according to claim 13, wherein said operating mode includes at least one of a paper size, a one-side/double-side printing mode, a toner color, and a paper type.

18. A history information transmission method for an image forming device connected to an information processing apparatus through a network, said method comprising the steps of:

storing history information obtained by image processing executed a plurality of times by said image forming device, wherein said history information includes an operating mode, which includes a plurality of settings of said image forming device, and at least one of user identification information of a user who used said image forming device and a number of sheets discharged from said image forming device;

transmitting said history information stored in said history information storage step to said information processing apparatus in response to a history information acquisition request transmitted from said information processing apparatus;

transferring said history information in accordance with a request sent from said information processing apparatus; and clearing said history information relating to said image processing executed a plurality of times by said imag forming device stored in said history information storage step when said history information is transferred to said information processing apparatus.

19. A method according to claim 18, further comprising the steps of:

receiving said history information acquisition request transmitted from said information processing apparatus; and transmitting said stored history information according to said history information acquisition request received.

20. A method according to claim 18, further comprising the step of:

notifying said information processing apparatus of an amount of said history information stored.

21. A method according to claim 20, wherein said notifying step is executed to notify said information processing apparatus when said amount of history information reaches a predetermined amount.

22. A method according to claim 18, wherein said image forming device includes at least one of a printer function, a copying function, a facsimile function, and a scanner function.

23. An image forming device control method of controlling an image forming device having history information storage means for storing history information relating to image processing executed a plurality of times by said image forming device, wherein said history information includes an operating mode, which includes a plurality of settings of said image forming device, and at least one of user identification information of a user who used said image forming device and a number of sheets discharged from said image forming device, said method comprising the steps of:

transmitting a history information acquisition request to said image forming device, for acquiring said history information stored by said history information storage means according to said history information acquisition request; and storing said history information acquired in said history information acquisition step as a counter table prepared for each operating mode, which includes a plurality of settings of said image forming device;

transferring said history information in accordance with said history information acquisition request; and clearing said history information relating to said image processing executed by a plurality of times by said image forming device stored in said history information storage step when said history information is transferred to said information processing apparatus.

24. A method according to claim 23, wherein said operating mode includes at least one of a paper size, a one-side/double-side printing mode, a toner color, and a paper type.

25. A method according to claim 23, wherein said image forming device executes the steps of:

receiving said history information acquisition request transmitted from said information processing apparatus; and transmitting said stored history information according to said history information acquisition request received.

26. A method according to claim 23, wherein said image forming device includes at least one of a printer function, a copying function, a facsimile function, and a scanner function.

27. An image forming device control system comprising:

an information processing apparatus; and an image forming device including history information storage means for storing history information relating to image processing executed a plurality of times by said image forming device, and notification means for sending a notification to said information processing apparatus in response to an amount of the stored history information in said history information storage means reaching a predetermined amount, wherein:

said history information includes an operating mode, which includes a plurality of settings of said image forming device, and at least one of user identification information of a user who used said image forming device and a number of sheets discharged from said image forming device, said information processing apparatus includes receiving means for receiving the notification from said notification means, history information acquisition means for transmitting a history information acquisition request to said image forming device after said receiving means receives the notification and for acquiring said history information stored by said history information storage means, and storage means for storing said history information acquired by said history information acquisition means as a counter table prepared for each operating mode, which includes a plurality of settings of said image forming device, and said image forming device further includes transfer means for transferring said history information in accordance with said history information acquisition request to said information processing apparatus.

28. A history information transmission method for an image forming device control system having an information processing apparatus, and an image forming device, comprising the steps of:

storing history information relating to image processing executed a plurality of times by said image forming device;

sending a notification from said image forming device to said information processing apparatus in response to an amount of the stored history information in said history information storage means reaching a predetermined amount;

receiving the notification transmitted from said image forming device by said information processing apparatus;

transmitting a history information acquisition request from said information processing apparatus to said image forming device after the notification is received in said receiving step;

acquiring said history information stored in said history information storing step by said information processing apparatus;

storing said history information acquired in said history information acquisition step as a counter table prepared for each operating mode, which includes a plurality of settings of said image forming device, by said information processing apparatus; and transferring said history information in accordance with said history information acquisition request from said image forming device to said information processing apparatus.

* * * * *